United States Patent
Shrivastava et al.

(10) Patent No.: US 12,483,444 B2
(45) Date of Patent: Nov. 25, 2025

(54) METHODS AND APPARATUS FOR EDGE-TRIGGERED DIGITAL ISOLATOR CIRCUITRY

(71) Applicant: Texas Instruments Incorporated, Dallas, TX (US)

(72) Inventors: Kumar Anurag Shrivastava, Bangalore (IN); Sreeram S, Bangalore (IN); Tarunvir Singh, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 264 days.

(21) Appl. No.: 18/204,260

(22) Filed: May 31, 2023

(65) Prior Publication Data

US 2024/0291696 A1  Aug. 29, 2024

(30) Foreign Application Priority Data

Feb. 27, 2023 (IN) .............................. 202341013121

(51) Int. Cl.
*H04L 25/02* (2006.01)
*H03K 5/19* (2006.01)
*H03K 19/173* (2006.01)
*H04B 1/04* (2006.01)
*H04B 1/16* (2006.01)

(52) U.S. Cl.
CPC ........... *H04L 25/0266* (2013.01); *H03K 5/19* (2013.01); *H03K 19/173* (2013.01); *H04B 1/04* (2013.01); *H04B 1/16* (2013.01)

(58) Field of Classification Search
CPC .................................................. H04L 25/0266
USPC ......................................................... 327/100
See application file for complete search history.

(56) References Cited

U.S. PATENT DOCUMENTS

2016/0358705 A1*  12/2016  Lin .......................... H02M 1/40

\* cited by examiner

*Primary Examiner* — Tomi Skibinski
(74) *Attorney, Agent, or Firm* — Mandy Barsilai Fernandez; Frank D. Cimino

(57) ABSTRACT

An example apparatus includes: transmitter channel circuitry including: a buffer having an output; and a capacitor having a first terminal and a second terminal, the first terminal of the capacitor coupled to the output of the buffer; an isolation transformer including: a first inductor having a terminal coupled to the second terminal of the capacitor; and a second inductor magnetically coupled to the first inductor across an isolation barrier, and receiver channel circuitry coupled to the second inductor.

21 Claims, 7 Drawing Sheets

METHODS AND APPARATUS FOR EDGE-TRIGGERED DIGITAL ISOLATOR CIRCUITRY

CROSS-REFERENCE TO RELATED APPLICATION

This patent arises from a patent application that claims the benefit of and priority to IN Provisional Patent Application Ser. No. 202341013121 filed Feb. 27, 2023, which is hereby incorporated herein by reference in its entirety.

TECHNICAL FIELD

This description relates generally to digital isolation and, more particularly, to methods and apparatus for edge-triggered digital isolator circuitry.

BACKGROUND

Electronic devices integrate a wide range of electronic systems into a single device and/or package. Some multi-system devices include first circuitry that utilizes a first power domain (e.g., power supply or operating range), while a second system utilizes a second power domain. In such devices, isolator circuitry interfaces between circuitry in different power domains to prevent circuitry damage. Isolator circuitry includes an isolation barrier separating transmitter circuitry from receiver circuitry. The transmitter circuitry transmits data from a first power domain across the isolation barrier to the receiver circuitry in the second power domain. Data transmission across the isolation barrier enables communication between power domains and reduces a likelihood of the first power domain interfering with or damaging circuitry of the second power domain.

SUMMARY

For methods and apparatus for edge-triggered digital isolator circuitry, an example apparatus includes transmitter channel circuitry including: a buffer having an output; and a capacitor having a first terminal and a second terminal, the first terminal of the capacitor coupled to the output of the buffer; an isolation transformer including: a first inductor having a terminal coupled to the second terminal of the capacitor; and a second inductor magnetically coupled to the first inductor across an isolation barrier; and receiver channel circuitry coupled to the second inductor.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
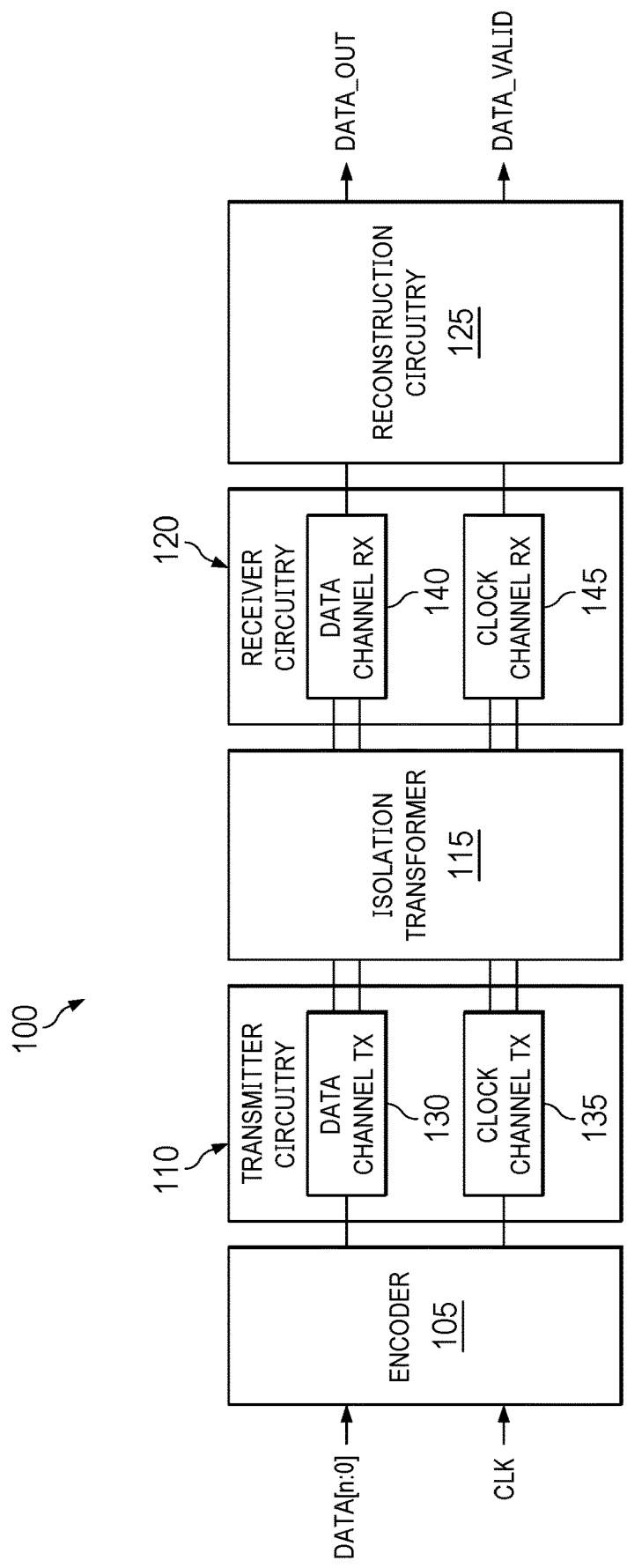
FIG. 1 is a block diagram of example digital isolator circuitry including transmitter circuitry, receiver circuitry, and reconstruction circuitry, wherein the digital isolator circuitry transmits and receives data across an isolation barrier.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Electronic devices integrate a wide range of electronic systems into a single device and/or package. Some multi-system devices include first circuitry that utilizes a first power domain (e.g., power supply or operating range), while a second system utilizes a second power domain. In some applications, exposing the first circuitry to the second power domain may damage the first circuitry. Safely interfacing between circuitries that utilize different power domains becomes increasingly difficult as transmission speeds increase, differences between power domains increase, and device packages decrease.

One technique to interface between circuitries of different power domains is to include isolator circuitry between circuitries. Isolator circuitry interfaces between circuitry to prevent circuitry in different power domains from damaging one another. Isolator circuitry includes transmitter circuitry, an isolation barrier, and receiver circuitry. The transmitter circuitry transmits data to the receiver circuitry by the isolation barrier.

The transmitter circuitry conditions data for transmission across the isolation barrier. Designers select a technique of conditioning data for transmission across the isolation barrier based on transmission speeds, power consumption, and timing constraints. One technique for conditioning data for transmission across the isolation barrier is to increase a drive strength of a signal which is to traverse the isolation barrier. Such a method has a relatively low complexity. However, techniques using drivers may require multiple, parallel data streams to transmit data across an isolation barrier at relatively high speeds, which increases power consumption and cost.

Examples described herein include isolator circuitry that utilizes edge-triggered conditioning to transmit data across an isolation barrier. Edge-triggered conditioning utilizes rising and falling edges of digital data streams to transmit and reconstruct the digital data. In some described examples, the isolator circuitry includes transmitter circuitry, an isolator, and receiver circuitry. The transmitter circuitry conditions data for transmission across the isolator using rising and falling edges of the data stream. The transmitter circuitry generates voltage rings to represent the rising and falling edges of the data stream. The receiver circuitry determines locations of edges of the data stream by detecting voltage rings from the transmitter circuitry that have passed through the isolator. In some examples, reconstruction circuitry reconstructs and validates the data stream using edges detected by the receiver circuitry.

FIG. 1 is a block diagram of example digital isolator circuitry 100. In the example of FIG. 1, the digital isolator circuitry 100 includes an encoder 105, transmitter circuitry 110, an isolator 115, receiver circuitry 120, and reconstruction circuitry 125. The digital isolator circuitry 100 uses the transmitter circuitry 110 to transmit data from the encoder 105 across the isolator 115 to the receiver circuitry 120. The digital isolator circuitry 100 conditions the data for transmission, as described below, using an edge triggered scheme.

In the example of FIG. 1, the encoder 105 has data inputs (DATA[n:0]) and a clock input (CLK). The data and clock inputs of the encoder 105 may be coupled to a data source, such as programmable circuitry or external circuitry. The clock input may be coupled to a clock source, such as a crystal oscillator, a resistor capacitor oscillator, etc. The encoder 105 has a first output and a second output coupled to the transmitter circuitry 110. The encoder 105 encodes data at the data inputs to generate a serial data stream at the first output of the encoder 105. The encoder 105 serializes the data inputs to generate the serial data stream based on a clock signal at the clock input of the encoder 105. In some examples, the encoder 105 serializes the data inputs of the encoder 105 when the clock input of the encoder 105 is supplied a clock signal. The encoder 105 supplies the serial data stream to the transmitter circuitry 110 at the first output of the encoder 105.

The encoder 105 generates a clock signal at the second output of the encoder by, for example, dividing a frequency of an input clock coupled to the clock input of the encoder 105. In some examples, the encoder 105 divides the frequency of the input clock by two to generate the clock signal. The encoder 105 may divide the frequency of the input clock by other factors or may not divide the input clock at all. The encoder 105 supplies the clock signal to the transmitter circuitry 110 at the second output of the encoder 105.

In the example of FIG. 1, the transmitter circuitry 110 is coupled to and receives inputs from the encoder 105. The transmitter circuitry 110 has outputs coupled to the isolator 115. In the example of FIG. 1, the transmitter circuitry 110 includes first example transmitter channel circuitry 130 and second example transmitter channel circuitry 135. The transmitter circuitry 110 receives the serial data stream and the clock signal from the encoder 105. The transmitter circuitry 110 conditions the serial data stream and the clock signal for transmission across the isolator 115.

The first transmitter channel circuitry 130 has an input coupled to the encoder 105. The first transmitter channel circuitry 130 has outputs coupled to the isolator 115. The first transmitter channel circuitry 130 receives the serial data stream from the encoder 105 and, in some examples, converts the serial data stream from a single ended signal to a differential signal. The first transmitter channel circuitry 130 includes circuitry to implement an edge-triggered scheme to condition the serial data stream and cause transmission of data across the isolator 115. The edge-triggered scheme utilizes rising and falling edges of the serial data stream to generate voltage ripples representing the serial data stream. A series of voltage ripples generated in response to one of a rising or falling edge of the serial data stream may be referred to as a voltage ring. Example voltage rings are illustrated and described in further detail in FIG. 4, below. The first transmitter channel circuitry 130 supplies the voltage ripples to the isolator 115 at the outputs of the first transmitter channel circuitry 130.

In one example, the second transmitter channel circuitry 135 has an input coupled to the encoder 105. The second transmitter channel circuitry 135 has outputs coupled to the isolator 115. The second transmitter channel circuitry 135 receives the clock signal from the encoder 105. The second transmitter channel circuitry 135 converts the clock signal from a single ended signal to a differential signal. The second transmitter channel circuitry 135 includes circuitry to implement the edge-triggered scheme to cause transmission of the clock signal across the isolator 115. The edge-triggered transmission scheme utilizes rising and falling edges of the clock signal to generate voltage ripples representing the clock signal. The second transmitter channel circuitry 135 represents rising and falling edges of the clock signal by generating voltage rings. Example voltage rings are illustrated and described in further detail in FIG. 4, below. The second transmitter channel circuitry 135 supplies the voltage ripples to the isolator 115 at the outputs of the second transmitter channel circuitry 135.

The isolator 115 has inputs electrically coupled to the transmitter circuitry 110 and outputs electrically coupled to the receiver circuitry 120. The isolator 115 isolates the transmitter circuitry 110 from the receiver circuitry 120. The isolator 115 receives voltage ripples from the transmitter circuitry 110 at the inputs of the isolator 115 and supplies first and second induced voltage ripples to the receiver circuitry 120 at the outputs of the isolator 115. The first induced voltage ripples correspond to the voltage ripples from the first transmitter channel circuitry 130. The second induced voltage ripples correspond to the voltage ripples from the second transmitter channel circuitry 135.

The receiver circuitry 120 has inputs coupled to the isolator 115. The receiver circuitry 120 has outputs coupled to the reconstruction circuitry 125. In the example of FIG. 1, the receiver circuitry 120 includes first example receiver channel circuitry 140 and second example receiver channel circuitry 145. The receiver circuitry 120 receives the induced voltage ripples from the isolator 115 at the inputs of the receiver circuitry 120 and converts the induced voltage ripples into pulse trains, which includes a sequence or series of pulses. The pulses of the pulse trains represent rising edges and falling edges of the serial data stream and clock signal from the encoder 105. The receiver circuitry 120 supplies the pulse trains to the reconstruction circuitry 125 at the outputs of the receiver circuitry 120.

The first receiver channel circuitry 140 has inputs coupled to the isolator 115. The first receiver channel circuitry 140 has an output coupled to the reconstruction circuitry 125. The first receiver channel circuitry 140 receives the first induced voltage ripples at the inputs of the first receiver channel circuitry 140. The first voltage ripples at the inputs of the first receiver channel circuitry 140 are a differential representation of the serial data stream from the encoder 105. The first receiver channel circuitry 140 detects voltage rings that were generated by a rising or falling edge of the serial data stream. The first receiver channel circuitry 140 generates a pulse to represent the rising or falling edge of the serial data stream. The first receiver channel circuitry 140 creates a data pulse train that includes a plurality of pulses. The data pulse train represents timing of rising and falling edges of the serial data stream using pulses. The first receiver channel circuitry 140 supplies the data pulse train to the reconstruction circuitry 125 by the output of the first receiver channel circuitry 140.

The second receiver channel circuitry 145 has inputs coupled to the isolator 115. The second receiver channel circuitry 145 has an output coupled to the reconstruction circuitry 125. The second receiver channel circuitry 145 receives the second voltage ripples at the inputs of the second receiver channel circuitry 145. The second voltage ripples at the inputs of the second receiver channel circuitry 145 are a differential representation of the clock signal from the encoder 105. The second receiver channel circuitry 145 detects voltage rings that were generated by a rising or falling edge of the clock signal. The second receiver channel circuitry 145 generates a pulse to represent the rising or falling edge of the clock signal. The second receiver channel circuitry 145 creates a clock pulse train that includes a plurality of pulses. The clock pulse train represents the timing of rising and falling edges of the clock signal using pulses. The second receiver channel circuitry 145 supplies the clock pulse train to the reconstruction circuitry 125 by the output of the second receiver channel circuitry 145.

The reconstruction circuitry 125 has a first and second input coupled to the receiver circuitry 120. The reconstruction circuitry 125 has a first and second output. The reconstruction circuitry 125 receives the data pulse train from the receiver circuitry 120 at the first input of the reconstruction circuitry 125. The reconstruction circuitry 125 receives the clock pulse train from the receiver circuitry 120 at the second input of the reconstruction circuitry 125. The reconstruction circuitry 125 generates a reconstructed serial data stream based on the data pulse train at the first output of the reconstruction circuitry 125. In an example operation, the reconstructed serial data stream is approximately equal to the serial data stream at the first output of the encoder 105. The reconstruction circuitry 125 determines if the reconstructed serial data stream is a valid reconstruction of the serial data stream from the encoder 105 based on the clock pulse train and the reconstructed serial data stream. Data of the reconstructed serial data stream is considered to be valid after confirming a final edge of the reconstructed serial data is a falling edge. In some examples, the reconstruction circuitry 125 determines the reconstructed serial data stream is valid after verifying that the reconstructed serial data stream is a logic low when the clock signal corresponding to the clock pulse train has halted. The reconstruction circuitry 125 resets the reconstructed serial data stream after determining the data is invalid. For example, the reconstruction circuitry 125 sets the reconstructed serial data stream equal to a logic zero after determining data of the reconstructed serial data stream is invalid.

Figure 2:
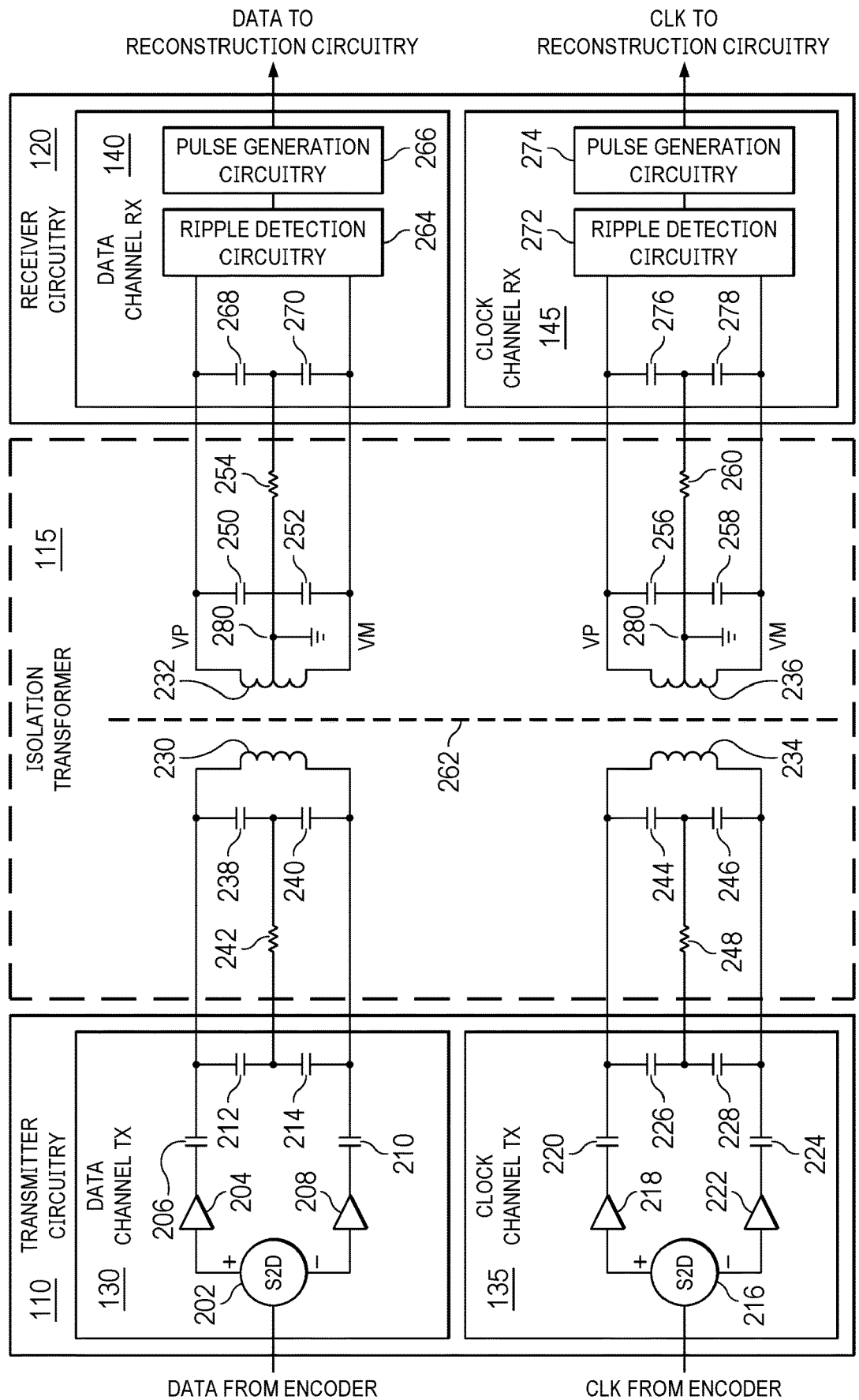
FIG. 2 is a schematic diagram of an example of the digital isolator circuitry of FIG. 1.

FIG. 2 is a schematic diagram of an example of the transmitter circuitry 110 of FIG. 1, the isolator 115 of FIG. 1, and the receiver circuitry 120 of FIG. 1. In the example of FIG. 2, the transmitter circuitry 110 includes the first transmitter channel circuitry 130 of FIG. 1 and the second transmitter channel circuitry 135 of FIG. 1. In some examples, the transmitter circuitry 110 receives a serial data stream and a clock signal from the encoder 105 of FIG. 1. The transmitter circuitry 110 uses an edge-triggered scheme to condition data for transmission across the isolator 115.

In the example of FIG. 2, the first transmitter channel circuitry 130 includes a first example single ended-to-differential (S2D) converter 202, a first example buffer 204, a first example capacitor 206, a second example buffer 208, and a second example capacitor 210. The first transmitter channel circuitry 130 receives a serial data stream to condition for transmission across the isolator 115.

The first S2D converter 202 has an input. The first S2D converter 202 has a first output and a second output. The first S2D converter 202 converts single-ended signals supplied at the input of the first S2D converter 202 to differential signals at the first and second outputs of the first S2D converter 202. A single-ended signal is a signal whose value is determined in relation to a common terminal that provides a common potential (e.g., ground). A differential signal is a signal whose value is determined based on a difference between a non-inverted signal and an inverted signal. In an example operation, the first S2D converter 202 converts the single-ended serial data stream from the encoder 105 to a differential serial data stream. In such an example operation, the first output of the first S2D converter 202 is the non-inverted signal of the differential serial data stream and the second output of the first S2D converter 202 is the inverted signal of the differential serial data stream. The first S2D converter 202 supplies the differential serial data stream to the buffers 204 and 208 by the first and/or second outputs of the first S2D converter 202.

The first buffer 204 has an input coupled to the first S2D converter 202. The first buffer 204 has an output coupled to the first capacitor 206. The first buffer 204 receives the non-inverted signal of the differential serial data stream from the first S2D converter 202. The first buffer 204 generates a buffered non-inverted signal by buffering the non-inverted signal. The first buffer 204 supplies the buffered non-inverted signal to the first capacitor 206 at the output of the first buffer 204.

The first capacitor 206 has a first terminal coupled to the first buffer 204. The first capacitor 206 has a second terminal coupled to the isolator 115. The first capacitor 206 receives the buffered non-inverted signal from the first buffer 204. The first capacitor 206 creates voltage ripples to represent rising and falling edges of the buffered non-inverted signal. The voltage ripples are a result of the first capacitor 206 resisting relatively fast changes in the voltage of the first terminal of the first capacitor 206. In an example operation, falling edges and rising edges of the buffered non-inverted signal are relatively fast changes in voltage that cause the first capacitor 206 to create voltage ripples. The first capacitor 206 has a capacitance selected based on a speed of the serial data stream. The capacitance of the first capacitor 206 may be modified to increase or decrease settling time of the voltage ripples.

The second buffer 208 has an input coupled to the first S2D converter 202. The second buffer 208 has an output coupled to the second capacitor 210. The second buffer 208 receives the inverted signal of the differential serial data stream from the first S2D converter 202. The second buffer 208 generates a buffered inverted signal by buffering the inverted signal. The second buffer 208 supplies the buffered inverted signal to the second capacitor 210 at the output of the second buffer 208.

The second capacitor 210 has a first terminal coupled to the second buffer 208. The second capacitor 210 has a second terminal coupled to the isolator 115. The second capacitor 210 receives the buffered inverted signal from the second buffer 208. The second capacitor 210 creates voltage ripples to represent rising and falling edges of the buffered inverted signal. The voltage ripples are a result of the second capacitor 210 resisting relatively fast changes in the voltage of the first terminal of the second capacitor 210. In an example operation, falling edges and rising edges of the buffered inverted signal are relatively fast changes in voltage that cause the first capacitor 206 to create voltage ripples. The second capacitor 210 has a capacitance selected based on a speed of the serial data stream. The capacitance of the second capacitor 210 may be modified to increase or decrease settling time of the voltage ripples.

In an example application of FIG. 2, the first transmitter channel circuitry 130 has a first example parasitic capacitance 212 and a second example parasitic capacitance 214. The parasitic capacitances 212 and 214 illustrate non-ideal characteristics of the circuitry of the first transmitter channel circuitry 130. In some examples, the parasitic capacitances 212 and/or 214 may not be illustrated. In other examples, additional circuitry and/or manufacturing methods may be used to reduce the parasitic capacitances 212 and/or 214.

The first parasitic capacitance 212 has a common terminal. The first parasitic capacitance 212 is formed between the second terminal of the first capacitor 206 and the common terminal of the first parasitic capacitance 212. The common terminal of the first parasitic capacitance 212 is coupled to the second parasitic capacitance 214. The second parasitic capacitance 214 has a common terminal. The second parasitic capacitance 214 is formed between the second terminal of the second capacitor 210 and the common terminal of the second parasitic capacitance 214. The common terminal of the second parasitic capacitance 214 is coupled to the first parasitic capacitance 212.

In the example of FIG. 2, the second transmitter channel circuitry 135 includes a second example S2D converter 216, a third example buffer 218, a third example capacitor 220, a fourth example buffer 222, and a fourth example capacitor 224. The second transmitter channel circuitry 135 receives a clock signal to condition for transmission across the isolator 115.

The second S2D converter 216 has an input. The second S2D converter 216 has a first output and a second output. The second S2D converter 216 converts single-ended signals supplied at the input to differential signals at the first and second outputs. In an example operation, the second S2D converter 216 converts the single-ended clock signal from the encoder 105 to a differential clock signal. In such an example operation, the first output of the second S2D converter 216 is the non-inverted signal of the differential clock signal and the second output of the second S2D converter 216 is the inverted signal of the differential clock signal. The second S2D converter 216 supplies the differential clock signal to the buffers 218 and 222 by the first and/or second outputs of the second S2D converter 216.

The third buffer 218 has an input coupled to the second S2D converter 216. The third buffer 218 has an output coupled to the third capacitor 220. The third buffer 218 receives the non-inverted signal of the differential clock signal from the second S2D converter 216. The third buffer 218 generates a buffered non-inverted signal by buffering the non-inverted signal. The third buffer 218 supplies the buffered non-inverted signal to the third capacitor 220 at the output of the third buffer 218.

The third capacitor 220 has a first terminal coupled to the third buffer 218. The third capacitor 220 has a second terminal coupled to the isolator 115 and the third parasitic capacitance 226. The third capacitor 220 receives the buffered non-inverted signal from the third buffer 218. The third capacitor 220 creates voltage ripples to represent rising and falling edges of the buffered non-inverted signal. The third capacitor 220 has a capacitance selected based on a speed of the clock signal. The capacitance of the third capacitor 220 may be modified to increase or decrease settling time of the voltage ripples.

The fourth buffer 222 has an input coupled to the second S2D converter 216. The fourth buffer 222 has an output coupled to the fourth capacitor 224. The fourth buffer 222 receives the inverted signal of the differential clock signal from the second S2D converter 216. The fourth buffer 222 generates a buffered inverted signal by buffering the inverted signal. The fourth buffer 222 supplies the buffered inverted signal to the fourth capacitor 224 at the output of the fourth buffer 222.

The fourth capacitor 224 has a first terminal coupled to the fourth buffer 222. The fourth capacitor 224 has a second terminal coupled to the isolator 115 and the fourth parasitic capacitance 228. The fourth capacitor 224 receives the buffered inverted signal from the fourth buffer 222. The fourth capacitor 224 creates voltage ripples to represent rising and falling edges of the buffered inverted signal. The capacitance of the fourth capacitor 224 may be modified to increase or decrease settling time of the voltage ripples.

In an example application of FIG. 2, the second transmitter channel circuitry 135 has a third example parasitic capacitance 226 and a fourth example parasitic capacitance 228. The parasitic capacitances 226 and 228 illustrate non-ideal characteristics of the circuitry of the second transmitter channel circuitry 135. In some examples, the parasitic capacitances 226 and/or 228 may not be illustrated. In other examples, additional circuitry and/or manufacturing methods may be used to reduce the parasitic capacitances 226 and/or 228.

The third parasitic capacitance 226 has a common terminal. The third parasitic capacitance 226 is formed between the second terminal of the third capacitor 220 and the common terminal of the third parasitic capacitance 226. The common terminal of the third parasitic capacitance 226 is coupled to the fourth parasitic capacitance 228. The fourth parasitic capacitance 228 has a common terminal. The fourth parasitic capacitance 228 is formed between the second terminal of the fourth capacitor 224 and the common terminal of the fourth parasitic capacitance 228. The common terminal of the fourth parasitic capacitance 228 is coupled to the third parasitic capacitance 226. In some examples, the parasitic capacitances 226 and/or 228 may not be illustrated. In other examples, additional circuitry and/or manufacturing methods may be used to reduce the parasitic capacitances 226 and/or 228.

In the example of FIG. 2, the isolator 115 includes a first example inductor 230, a second example inductor 232, a third example inductor 234, and a fourth example inductor 236. The isolator 115 isolates the transmitter circuitry 110 from the receiver circuitry 120. The transmitter circuitry 110 may transmit data across the isolator 115 to the receiver circuitry 120.

The first inductor 230 has a first terminal coupled to the first capacitor 206. The first inductor 230 has a second terminal coupled to the second capacitor 210. The first inductor 230 is magnetically coupled to the second inductor 232 across an example isolation barrier 262. In an example, the isolation barrier 262 is a silicon dioxide based isolation barrier. The first inductor 230 induces a current in the second inductor 232 based on the voltage ripples from the capacitors 206 and 210. Advantageously, using the first inductor 230 to induce current in the second inductor 232 allows the transmitter circuitry 110 to transmit voltage rings that represent the serial data stream across the isolation barrier 262.

The second inductor 232 has a first terminal (VP) coupled to the receiver circuitry 120. The second inductor 232 has a second terminal (VM) coupled to the receiver circuitry 120. The second inductor 232 has a third terminal coupled to a common terminal 280 that provides the common potential. The second inductor 232 is magnetically coupled to the first inductor 230 across the isolation barrier 262. The current induced in the second inductor 232 corresponds to the voltage ripples from the first transmitter channel circuitry 130. The second inductor 232 supplies the induced current to the first receiver channel circuitry 140 of FIG. 1.

The third inductor 234 has a first terminal coupled to the third capacitor 220. The third inductor 234 has a second terminal coupled to the fourth capacitor 224. The third inductor 234 is magnetically coupled to the fourth inductor 236 across the isolation barrier 262. The third inductor 234 induces a current in the fourth inductor 236 based on the voltage ripples from the capacitors 220 and 224. Advantageously, using the third inductor 234 to induce current in the fourth inductor 236 allows the transmitter circuitry 110 to transmit voltage rings that represent the clock signal across the isolation barrier 262.

The fourth inductor 236 has a first terminal (VP) coupled to the receiver circuitry 120. The fourth inductor 236 has a second terminal (VM) coupled to the receiver circuitry 120. The fourth inductor 236 has a third terminal coupled to the common terminal. The fourth inductor 236 is magnetically coupled to the third inductor 234 across the isolation barrier 262. The current induced in the fourth inductor 236 corresponds to the voltage ripples from the second transmitter channel circuitry 135. The fourth inductor 236 supplies the induced current to the second receiver channel circuitry 145 of FIG. 1.

In an example application of FIG. 2, the isolator 115 has a fifth example parasitic capacitance 238, a sixth example parasitic capacitance 240, a first example parasitic resistance 242, a seventh example parasitic capacitance 244, an eighth example parasitic capacitance 246, a second example parasitic resistance 248, a ninth example parasitic capacitance 250, a tenth example parasitic capacitance 252, a third example parasitic resistance 254, an eleventh example parasitic capacitance 256, a twelfth example parasitic capacitance 258, and a fourth example parasitic resistance 260. The parasitic components 238-260 illustrate non-ideal characteristics of the circuitry of the isolator 115. In some examples, the parasitic components 238-260 may not be illustrated. In other examples, additional circuitry and/or manufacturing methods may be used to reduce the parasitic components 238-260.

The fifth parasitic capacitance 238 has a common terminal. The fifth parasitic capacitance 238 is formed between the first terminal of the first inductor 230 and the common terminal of the fifth parasitic capacitance 238. The common terminal of the fifth parasitic capacitance 238 is coupled to the sixth parasitic capacitance 240 and the first resistance 242. The sixth parasitic capacitance 240 has a common terminal. The sixth parasitic capacitance 240 is formed between the second terminal of the first inductor 230 and the common terminal of the sixth parasitic capacitance 240. The common terminal of the sixth parasitic capacitance 240 is coupled to the fifth parasitic capacitance 238 and the first parasitic resistance 242. The first parasitic resistance 242 represents a parasitic resistance of an electrical trace which couples the common terminals of the parasitic capacitances 212 and 214 to the common terminals of the parasitic capacitances 238 and 240.

The seventh parasitic capacitance 244 has a common terminal. The seventh parasitic capacitance 244 is formed between the first terminal of the third inductor 234 and the common terminal of the seventh parasitic capacitance 244. The common terminal of the seventh parasitic capacitance 244 is coupled to the eighth parasitic capacitance 246 and the second parasitic resistance 248. The eighth parasitic capacitance 246 has a common terminal. The eighth parasitic capacitance 246 is formed between the second terminal of the third inductor 234 and the common terminal of the eighth parasitic capacitance 246. The common terminal of the eighth parasitic capacitance 246 is coupled to the seventh parasitic capacitance 244 and the second parasitic resistance 248. The second parasitic resistance 248 represents a parasitic resistance of an electrical trace which couples the common terminals of the parasitic capacitances 226 and 228 to the common terminals of the parasitic capacitances 244 and 246.

The ninth parasitic capacitance 250 has a common terminal. The ninth parasitic capacitance 250 is formed between the first terminal of the second inductor 232 and the common terminal of the ninth parasitic capacitance 250. The common terminal of the ninth parasitic capacitance 250 is coupled to the tenth parasitic capacitance 252 and the third parasitic resistance 254. The tenth parasitic capacitance 252 has a common terminal. The tenth parasitic capacitance 252 is formed between the second terminal of the second inductor 232 and the common terminal of the tenth parasitic capacitance 252. The common terminal of the tenth parasitic capacitance 252 is coupled to the ninth parasitic capacitance 250 and the third parasitic resistance 254. The third parasitic resistance 254 represents a parasitic resistance of an electrical trace which couples the first receiver channel circuitry 140 to the common terminals of the parasitic capacitances 250 and 252.

The eleventh parasitic capacitance 256 has a common terminal. The eleventh parasitic capacitance 256 is formed between the first terminal of the fourth inductor 236 and the common terminal of the eleventh parasitic capacitance 256. The common terminal of the eleventh parasitic capacitance 256 is coupled to the twelfth parasitic capacitance 258 and the fourth parasitic resistance 260. The twelfth parasitic capacitance 258 has a common terminal. The twelfth parasitic capacitance 258 is formed between the second terminal of the fourth inductor 236 and the common terminal of the twelfth parasitic capacitance 258. The common terminal of the twelfth parasitic capacitance 258 is coupled to the eleventh parasitic capacitance 256 and the fourth parasitic resistance 260. The fourth parasitic resistance 260 represents a parasitic resistance of an electrical trace which couples the second receiver channel circuitry 145 to the common terminals of the parasitic capacitances 256 and 258.

In some examples, the parasitic capacitances 238, 240, 244, 246, 250, 252, 256, and/or 258 and/or the parasitic resistances 242, 248, 254, and/or 260 may not be illustrated. In other examples, additional circuitry and/or manufacturing methods may be used to reduce the parasitic capacitances 238, 240, 244, 246, 250, 252, 256, and/or 258 and/or the parasitic resistances 242, 248, 254, and/or 260.

In the example of FIG. 2, the receiver circuitry 120 includes the first receiver channel circuitry 140 and the second receiver channel circuitry 145. In some examples, the receiver circuitry 120 receives first and second induced voltage rings from the isolator 115. The receiver circuitry 120 creates pulse trains to represent rising and falling edges of the serial data stream and the clock signal from the transmitter circuitry 110.

In the example of FIG. 2, the first receiver channel circuitry 140 includes first example ripple detection circuitry 264 and first example pulse generation circuitry 266. Also, the first receiver channel circuitry 140 has a thirteenth example parasitic capacitance 268 and a fourteenth example parasitic capacitance 270. The first receiver channel circuitry 140 receives first voltage ripples from the isolator 115. The first voltage ripples represent rising and falling edges of the serial data stream from the encoder 105.

The first ripple detection circuitry 264 has a first input coupled to the first terminal of the second inductor 232. The first ripple detection circuitry 264 has a second input coupled to the second terminal of the second inductor 232. The first ripple detection circuitry 264 receives current induced in the second inductor 232. The first ripple detection circuitry 264 detects when the current from the second inductor 232 corresponds to a voltage ripple. In some examples, the first ripple detection circuitry 264 detects voltage ripples by counting a number of zero crossings. In other examples, the first ripple detection circuitry 264 detects voltage ripples when the voltage resulting from the current induced in the second inductor 232 is greater than a threshold voltage. In some examples, the first ripple detection circuitry 264 may be implemented using comparator circuitry, edge detection circuitry, etc.

The first pulse generation circuitry 266 has an input coupled to the first ripple detection circuitry 264. The first pulse generation circuitry 266 generates a data pulse train at an output of the first pulse generation circuitry 266. The first pulse generation circuitry 266 generates a pulse after the first pulse generation circuitry 266 detects a voltage ripple. The first pulse generation circuitry 266 generates the data pulse train by generating a plurality of pulses to represent a plurality of voltage ripples. In some examples, the first pulse generation circuitry 266 may be implemented using clock generation circuitry.

The thirteenth parasitic capacitance 268 has a common terminal. The thirteenth parasitic capacitance 268 is formed between the first input of the first ripple detection circuitry 264 and the common terminal of the thirteenth parasitic capacitance 268. The common terminal of the thirteenth parasitic capacitance 268 is coupled to the fourteenth parasitic capacitance 270 and the third parasitic resistance 254. The fourteenth parasitic capacitance 270 has a common terminal. The fourteenth parasitic capacitance 270 is formed between the second input of the first pulse generation circuitry 266 and the common terminal of the fourteenth parasitic capacitance 270. The common terminal of the fourteenth parasitic capacitance 270 is coupled to the thirteenth parasitic capacitance 268 and the third parasitic resistance 254. In some examples, the parasitic capacitances 268 and/or 270, may not be illustrated. In other examples, additional circuitry and/or manufacturing methods may be used to reduce the parasitic capacitances 268 and/or 270.

In the example of FIG. 2, the second receiver channel circuitry 145 includes second example ripple detection circuitry 272 and second example pulse generation circuitry 274. Also, the second receiver channel circuitry 145 has a fifteenth example parasitic capacitance 276 and a sixteenth example parasitic capacitance 278. The second receiver channel circuitry 145 receives second voltage ripples from the isolator 115. The second voltage ripples represent rising and falling edges of the clock signal from the encoder 105.

The second ripple detection circuitry 272 has a first input coupled to the first terminal of the fourth inductor 236. The second ripple detection circuitry 272 has a second input coupled to the second terminal of the fourth inductor 236. The second ripple detection circuitry 272 receives current induced in the fourth inductor 236. The second ripple detection circuitry 272 detects when the current from the fourth inductor 236 corresponds to a voltage ripple. In some examples, the second ripple detection circuitry 272 detects voltage ripples by counting a number of zero crossings. In other examples, the second ripple detection circuitry 272 detects voltage ripples when the voltage resulting from the current induced in the fourth inductor 236 is greater than a threshold voltage.

The second pulse generation circuitry 274 has an input coupled to the second ripple detection circuitry 272. The second pulse generation circuitry 274 generates a clock pulse train at an output of the second pulse generation circuitry 274. The second pulse generation circuitry 274 generates a pulse after the second ripple detection circuitry 272 detects a voltage ripple. The second pulse generation circuitry 274 generates the clock pulse train by generating a plurality of pulses to represent a plurality of voltage ripples.

The fifteenth parasitic capacitance 276 has a common terminal. The fifteenth parasitic capacitance 276 is formed between the first input of the second ripple detection circuitry 272 and the common terminal of the fifteenth parasitic capacitance 276. The common terminal of the fifteenth parasitic capacitance 276 is coupled to the sixteenth parasitic capacitance 278 and the fourth parasitic resistance 260. The sixteenth parasitic capacitance 276 has a common terminal. The sixteenth parasitic capacitance 278 is formed between the second input of the second ripple detection circuitry 272 and the common terminal of the sixteenth parasitic capacitance 278. The common terminal of the sixteenth parasitic capacitance 278 is coupled to the fifteenth parasitic capacitance 276 and the fourth parasitic resistance 260. In some examples, the parasitic capacitances 276 and/or 278, may not be illustrated. In other examples, additional circuitry and/or manufacturing methods may be used to reduce the parasitic capacitances 276 and/or 278.

Figure 3:
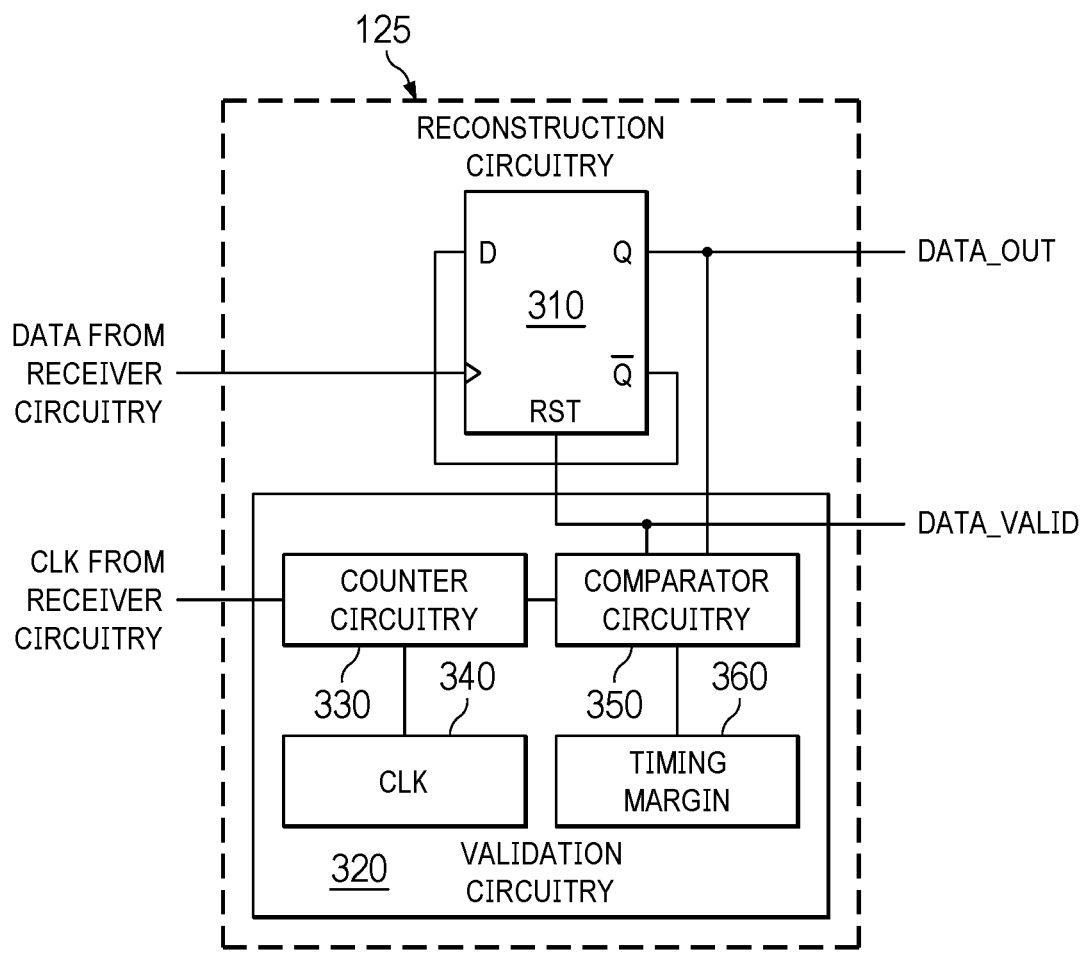
FIG. 3 is a schematic diagram of an example of the reconstruction circuitry of FIG. 1.

FIG. 3 is a schematic diagram of an example of the reconstruction circuitry 125 of FIG. 1. In the example of FIG. 3, the reconstruction circuitry 125 includes an example flip-flop 310 and example validation circuitry 320. The reconstruction circuitry 125 receives a data pulse train and a clock pulse train from the receiver circuitry 120 of FIGS. 1 and 2. The reconstruction circuitry 125 generates a reconstructed serial data stream based on the data pulse train using the flip-flop 310. The reconstruction circuitry 125 validates the serial data stream based on the clock pulse train and the reconstructed serial data stream using the validation circuitry 320.

The flip-flop 310 has a data input (D), a clock input, a reset input (RST), a non-inverted output (Q), and an inverted output (Q). The data input of the flip-flop 310 is coupled to the inverted output of the flip-flop 310. The clock input to the flip-flop 310 receives the data pulse train. In some examples, such as FIG. 1, the clock input of the flip-flop 310 is coupled to the first receiver channel circuitry 140 of FIGS. 1 and 2. The reset input of the flip-flop 310 is coupled to the validation circuitry 320. The flip-flop 310 generates a serial data stream at the non-inverted output of the flip-flop 310. In an example operation, the flip-flop 310 latches the inverted output of the flip-flop 310 based on pulses of the data pulse train at the clock input of the flip-flop 310. In such an example operation, the non-inverted output of the flip-flop 310 switches between a logic high (e.g., a logical one) and a logic low (e.g., a logical zero). The flip-flop 310 sets the non-inverted output of the flip-flop 310 to a logic low when the validation circuitry 320 sets the reset input of the flip-flop 310 to a logic high. In the example of FIG. 3, the flip-flop 310 is a D-flip-flop. Alternatively, the reconstruction circuitry 125 may be modified such that the flip-flop 310 may be a set-reset (SR) latch, a JK flip-flop, a toggle (T) flip-flop, etc.

In the example of FIG. 3, the validation circuitry 320 includes example counter circuitry 330, an example clock 340, example comparator circuitry 350, and an example timing margin 360. The validation circuitry 320 receives a clock pulse train representative of a clock signal. In the example of FIGS. 1, the validation circuitry 320 receives the clock pulse train from the second receiver channel circuitry 145 of FIGS. 1 and 2.

The validation circuitry 320 determines if the reconstructed data stream is valid based on the clock pulse train and the non-inverted output of the flip-flop 310. The serial data stream at the non-inverting output of the flip-flop 310 is valid when the data pulse train accurately represents the rising and falling edges of the serial data stream from the encoder 105 of FIG. 1. The serial data stream at the non-inverting output of the flip-flop 310 is invalid when the data pulse train fails to accurately represent the rising and falling edges of the serial data stream from the encoder 105. For example, the first receiver channel circuitry 140 fails to generate a pulse for a rising or falling edge of the serial data stream. In such an example, the flip-flop 310 fails to transition from a logic high to a logic low on a final pulse of a data transmission responsive to a missing pulse on the data pulse train.

The counter circuitry 330 has a first input, a second input, and an output. The counter circuitry 330 receives the clock pulse train at the first input of the counter circuitry 330. In some examples, such as FIG. 1, the second receiver channel circuitry 145 supplies the clock pulse train to the counter circuitry 330. The second input or the counter circuitry 330 is coupled to the clock 340. The clock 340 supplies a reference clock signal to the second input of counter circuitry 330. The output of the counter circuitry 330 is coupled to the comparator circuitry 350.

The counter circuitry 330 determines a duration since a previous pulse of the clock pulse train at the first input of the counter circuitry 330. In some examples, the counter circuitry 330 increments a count for each cycle of the reference clock signal after a pulse of the clock pulse train. In such examples, the counter circuitry 330 resets the count after detecting a subsequent clock pulse. Alternatively, another method of determining a duration between cycles may be used in accordance with the teachings described herein. The counter circuitry 330 supplies the duration since a previous pulse to the comparator circuitry 350.

The comparator circuitry 350 has a first input coupled to the counter circuitry 330. The comparator circuitry 350 has a second input coupled to the timing margin 360. The comparator circuitry 350 has a third input coupled to the non-inverted output of the flip-flop 310. The comparator circuitry 350 has an output coupled to the reset input of the flip-flop 310. The comparator circuitry 350 receives the duration since a previous pulse from the counter circuitry 330. The comparator circuitry 350 receives a timeout threshold from the timing margin 360. The comparator circuitry 350 receives the serial data stream from the flip-flop 310.

The comparator circuitry 350 determines if the serial data stream is valid based on the duration since a previous pulse and the timeout threshold. The comparator circuitry 350 compares the duration since a previous pulse to the timeout threshold. If the duration since a previous pulse is greater than or equal to the timeout threshold, the comparator circuitry 350 determines if the reconstructed serial data stream is equal to a logic low. If the reconstructed serial data stream is equal to a logic low, the comparator circuitry 350 identifies the reconstructed serial data stream as valid by setting the output of the comparator circuitry 350 to a logic low. If the reconstructed serial data stream is equal to a logic high, the comparator circuitry 350 identifies the reconstructed serial data stream as invalid and sets the output of the comparator circuitry 350 to a logic high. In example operation, the comparator circuitry 350 resets the flip-flop 310 by setting the output of the comparator circuitry 350 to a logic high. In such an example operation, the non-inverting output of the flip-flop 310 is set to a logic low when the reset input of the flip-flop 310 is a logic high.

The timing margin 360 is coupled to the comparator circuitry 350. The timing margin 360 supplies the timeout threshold to the comparator circuitry 350. The timeout threshold is configurable by the timing margin 360. In some examples, the timing margin 360 may be a register. In other examples, the timing margin 360 may be an alternate type of memory.

Figure 4:
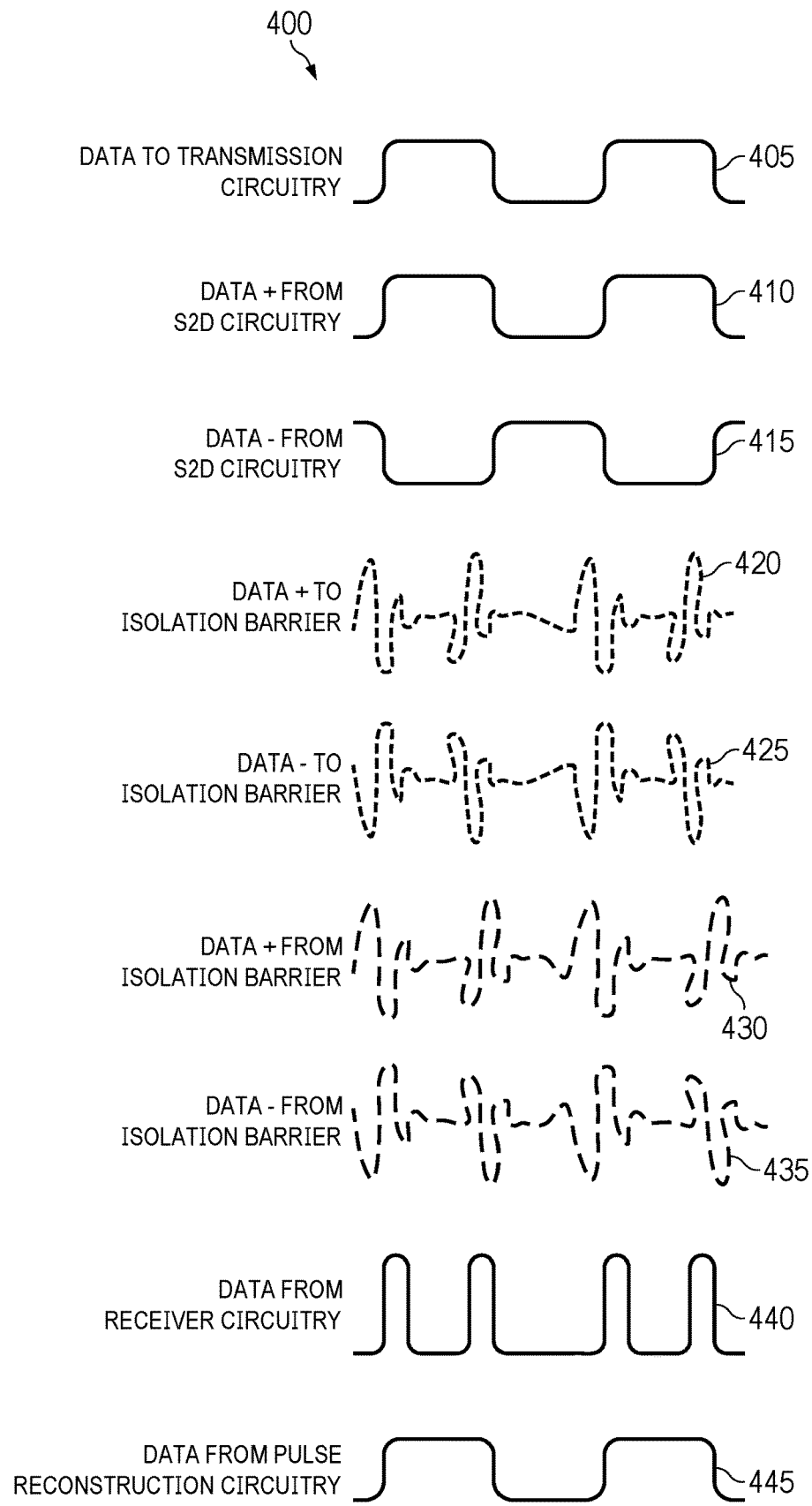
FIG. 4 is a timing diagram of an example operation of the digital isolator circuitry of FIGS. 1 and 2.

FIG. 4 is a timing diagram 400 of an example operation of the digital isolator circuitry 100 of FIGS. 1 and 2. In the example of FIG. 4, the timing diagram 400 includes an example serial data stream 405, an example non-inverted data stream 410, an example inverted data stream 415, an example non-inverted voltage rings 420, an example inverted voltage rings 425, an example induced non-inverted voltage rings 430, an example induced inverted voltage rings 435, an example data pulse train 440, and an example reconstructed data stream 445. The timing diagram 400 illustrates an example operation of the digital isolator circuitry 100 to transmit the serial data stream 405 across the isolator 115 of FIGS. 1 and 2.

The encoder 105 of FIG. 1 creates the serial data stream 405 by encoding the data inputs (DATA[n:0]) of the encoder 105. The first S2D converter 202 of FIG. 2 generates the data streams 410 and 415 responsive to the serial data stream 405. The first S2D converter 202 supplies the non-inverted data stream 410 to the first buffer 204 of FIG. 2. The first S2D converter 202 supplies the inverted data stream 415 to the second buffer 208 of FIG. 2.

Responsive to the buffered non-inverted data stream 410 at the output of the first buffer 204, the first capacitor 206 generate the non-inverted voltage ringing 420. The second buffer 208 creates the inverted voltage ringing 425 using the second capacitor 210 of FIG. 2 responsive to the inverted data stream 415.

The first inductor 230 of FIG. 2 induces the induced non-inverted voltage rings 430 in the second inductor 232 of FIG. 2 responsive to the non-inverted voltage ringing 420. The first inductor 230 induces the induced inverted voltage rings 435 in the second inductor 232 responsive to the inverted voltage ringing 425. The first receiver channel circuitry 140 of FIGS. 1 and 2 generates the data pulse train 440 responsive to the induced voltage rings 430 and 435. The reconstruction circuitry 125 of FIGS. 1 and 3 generates the reconstructed data stream 445 responsive to the data pulse train 440. Advantageously, the reconstructed data stream 445 is approximately equal to the serial data stream 405.

Figure 5:
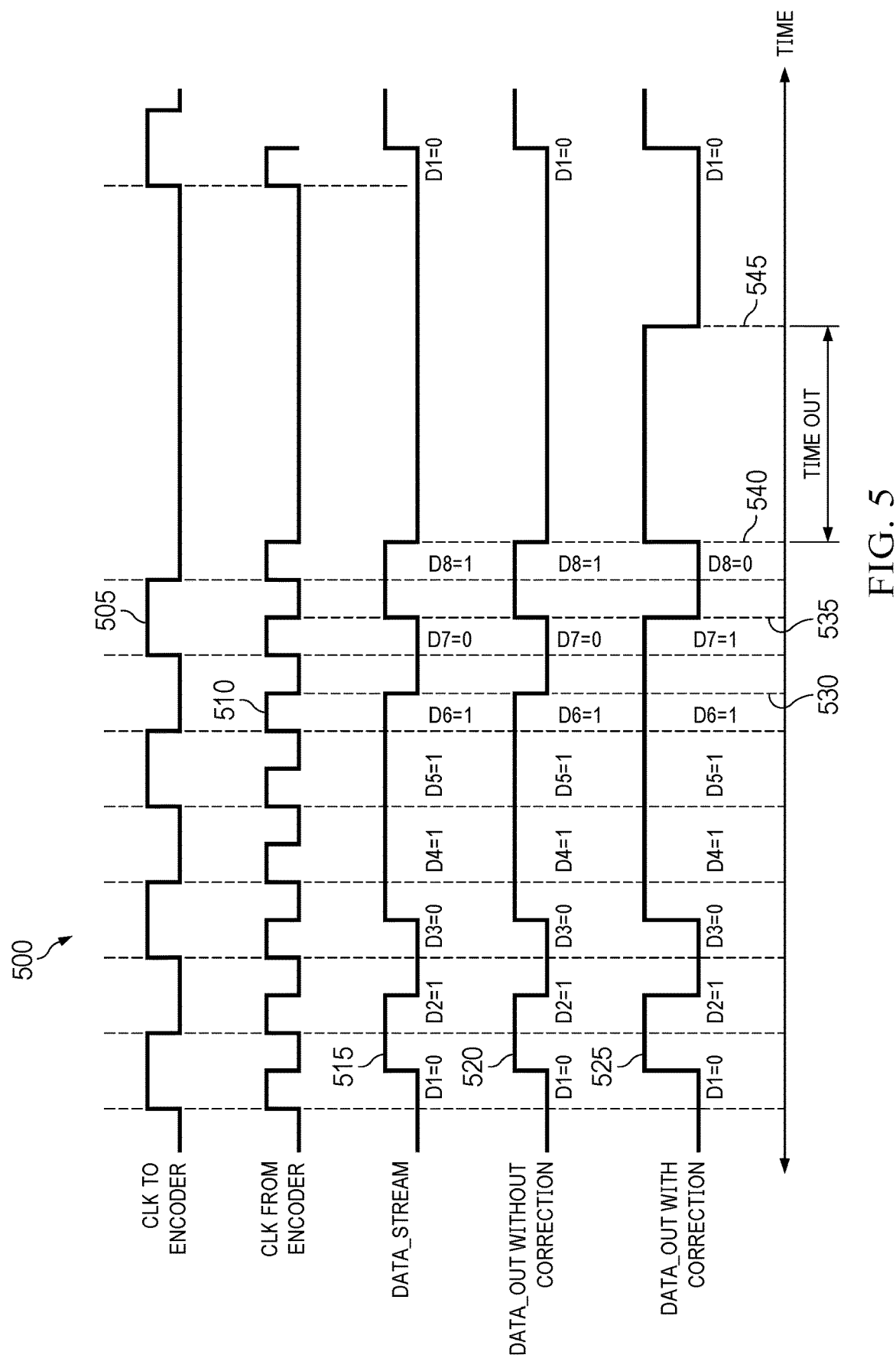
FIG. 5 is a timing diagram of an example operation of the digital isolator circuitry of FIGS. 1 and 2, the example operation including a correction of a reconstructed data stream by the reconstruction circuitry of FIGS. 1 and 3.

FIG. 5 is a timing diagram 500 of example operations of the digital isolator circuitry 100 of FIG. 1. In the example of FIG. 5, the timing diagram 500 includes an example pre-encoder clock 505, an example post-encoder clock 510, an example serial data stream 515, an example valid reconstructed data stream 520, and an example invalid reconstructed data stream 525. A first example operation is represented by the valid reconstructed data stream 520. In the first example operation, the validation circuitry 320 of FIG. 3 determines the valid reconstructed data stream 520 is valid. A second example operation is represented by the invalid reconstructed data stream 525. In the second example operation, the validation circuitry 320 determines the valid reconstructed data stream 520 is invalid.

The encoder 105 of FIG. 1 receives the pre-encoder clock 505. The encoder 105 creates the post-encoder clock 510. The encoder 105 creates the post-encoder clock 510 by approximately doubling the frequency of the pre-encoder clock 505. The encoder 105 creates the serial data stream 515 by sampling the data inputs (DATA[n:0]) of the encoder 105. In the example of FIG. 5, the encoder 105 has eight data inputs (DATA[7:0]). In such examples, the digital isolator circuitry 100 transmits the eight data inputs as the serial data stream 515.

After traversing the isolator 115 of FIGS. 1 and 2, the reconstruction circuitry 125 of FIGS. 1 and 3 creates the valid reconstructed data stream 520. The valid reconstructed data stream 520 is approximately equal to the serial data stream 515. The validation circuitry 320 of FIG. 3 determines that the valid reconstructed data stream 520 is a valid reconstruction of the serial data stream 515.

After traversing the isolator 115, the reconstruction circuitry 125 may create the invalid reconstructed data stream 525. The invalid reconstructed data stream 525 is an invalid reconstruction of the serial data stream 515. In the example operation of FIG. 5, the validation circuitry 320 determines that the invalid reconstructed data stream 525 is an invalid reconstruction of the serial data stream 515.

At a first time 530, the serial data stream 515 and the valid reconstructed data stream 520 transition from a logic high to a logic low. At the first time 530, the invalid reconstructed data stream 525 remains at a logic high. In some examples, at the first time 530, a data pulse train from the first receiver channel circuitry 140 of FIGS. 1 and 2 fails to represent a voltage ripple corresponding to the falling edge of the serial data stream 515. In such examples, the first inductor 230 of FIG. 2 may fail to induce a current that causes the first receiver channel circuitry 140 to generate a pulse.

At a second time 535, the serial data stream 515 and the valid reconstructed data stream 520 transition from a logic low to a logic high. At the second time 535, the invalid reconstructed data stream 525 transitions from a logic high to a logic low. At the second time 535, the first receiver channel circuitry 140 generates a pulse which inverts the non-inverting output of the flip-flop 310 of FIG. 3 responsive to the rising edge of the serial data stream 515. Although the receiver circuitry 120 accurately detected a voltage ripple corresponding to the rising edge of the serial data stream 515 at the second time 535, the invalid reconstructed data stream 525 continues to inaccurately represent the serial data stream 515.

At a third time 540, the serial data stream 515 and the valid reconstructed data stream 520 transition from a logic high to a logic low. At the third time 540, the serial data stream 515 has accurately transmitted all of the data inputs of the encoder 105. Immediately following the third time 540, the clocks 505 and 510 remain at a logic low to indicate that all of the data has been transmitted across the isolator 115. At the third time 540, the invalid reconstructed data stream 525 transitions from a logic low to a logic high.

Following the third time 540, the counter circuitry 330 begins to determine the duration since the clock cycle at the third time 540. At a fourth time 545, the comparator circuitry 350 of FIG. 3 determines that the duration since the clock cycle at the third time 540 is greater than or equal to the timeout threshold of the timing margin 360 of FIG. 3. The difference between the time 540 and 545 is approximately equal to the timeout threshold of the timing margin 360.

At the fourth time 545, the comparator circuitry 350 compares the non-inverting output of the flip-flop 310 to a logic low to determine if the data is valid. At the fourth time 545, the comparator circuitry 350 determines that the valid reconstructed data stream 520 is valid. At the fourth time 545, the comparator circuitry 350 determines that the invalid reconstructed data stream 525 is invalid. At the fourth time 545, the comparator circuitry 350 resets the flip-flop 310 to correct the invalid reconstructed data stream 525. Following the fourth time 545, the invalid reconstructed data stream 525 accurately represents the serial data stream 515. Advantageously, the reconstruction circuitry 125 corrects the invalid reconstructed data stream 525 prior to a subsequent transmission of data.

Figure 6:
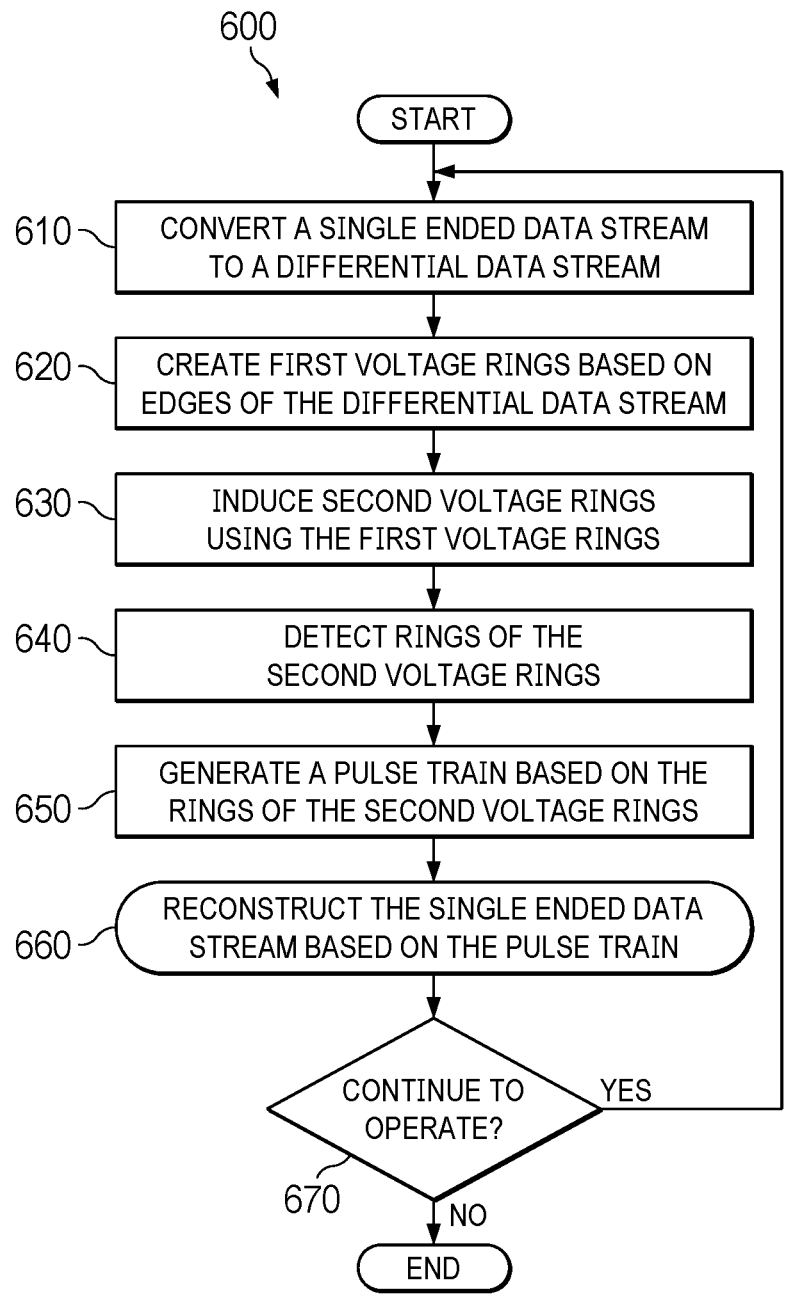
FIG. 6 is a flowchart representative of example operations of the digital isolator circuitry of FIGS. 1 and 2.

FIG. 6 is a flowchart representative of example operations 600 that may be performed by the digital isolator circuitry 100 of FIG. 1. The example operations 600 of FIG. 6 begin at block 610, at which the first S2D converter 202 of FIG. 2 converts a single ended data stream (e.g., the serial data stream 405 of FIG. 4) to a differential data stream. In some examples, the encoder 105 of FIG. 1 serializes the data inputs (DATA[n:0]) of the encoder 105 to generate the single ended data stream. In such examples, the first S2D converter 202 creates a differential data stream representative of the single ended data stream from the encoder 105. The differential data stream includes the non-inverted data stream 410 of FIG. 4 and the inverted data stream 415 of FIG. 4. In some examples, the second S2D converter 216 of FIG. 2 creates a differential clock signal representative of the single ended clock from the encoder 105.

The capacitors 206 and 210 of FIG. 2 create first voltage rings (e.g., the non-inverted voltage ringing 420 of FIG. 4 and/or the inverted voltage ringing 425 of FIG. 4) based on edges (e.g., rising and/or falling edges) of the differential data stream. (Block 620). In some examples, the capacitors 206 and 210 attempt to resist voltage variations in the rising and falling edges of the differential data stream. In such examples, the capacitors 206 and 210 settle on a voltage after rising and falling edges of the differential data stream. In another example, the capacitors 220 and 224 of FIG. 2 create voltage rings based on edges of the differential clock.

The first inductor 230 of FIG. 2 induces second voltage rings (e.g., induced non-inverted voltage rings 430 of FIG. 4 and the induced inverted voltage rings 435 of FIG. 4) in the second inductor 232 of FIG. 2 using the first voltage rings. (Block 630). In some examples, the first inductor 230 induces a current in the second inductor 232 responsive to the variations in the non-inverted voltage rings 420 and the inverted voltage rings 425. In such examples, the current generates the induced non-inverted voltage rings 430 and the induced inverted voltage rings 435. Advantageously, the first inductor 230 induces the second voltage rings across the isolation barrier 262 of FIG. 2. In another example, the third inductor 234 of FIG. 2 induces voltage rings in the fourth inductor 236 of FIG. 2 that represent a clock signal.

The first ripple detection circuitry 264 of FIG. 2 detects rings of the second voltage rings. (Block 640). In some examples, the first ripple detection circuitry 264 may determine rings of the second voltage rings based on a number of zero crossings, a threshold voltage, etc. In another example, the second ripple detection circuitry 272 of FIG. 2 detects rings of the voltage ringing corresponding to a clock signal.

The first pulse generation circuitry 266 of FIG. 2 generates a pulse train based on the rings of the second voltage rings. (Block 650). In some examples, the first pulse generation circuitry 266 generates a pulse in response to the first ripple detection circuitry 264 detecting a voltage ringing. In such examples, the pulse represents a rising or falling edge of the serial data stream. In another example, the second pulse generation circuitry 274 of FIG. 2 generates a pulse train based on the rings corresponding to a clock signal.

The reconstruction circuitry 125 of FIGS. 1 and 3 reconstructs the single ended data stream based on the pulse train. (Block 660). Example operations of Block 660 are described in further detail in FIG. 7, below.

The digital isolator circuitry 100 determines whether to continue to operate. (Block 670). In some examples, the digital isolator circuitry 100 continues to operate based on power supplied. In other examples, the digital isolator circuitry 100 does not operate while a clock signal is not being supplied by the encoder 105.

If the digital isolator circuitry 100 determines to continue to operate (e.g., Block 670 returns a result of YES), control proceeds to Block 610. If the digital isolator circuitry 100 determines not to continue to operate (e.g., Block 670 returns a result of NO), control proceeds to end.

Although example methods are described with reference to the flowchart illustrated in FIG. 6, many other methods of implementing the digital isolator circuitry 100 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

Figure 7:
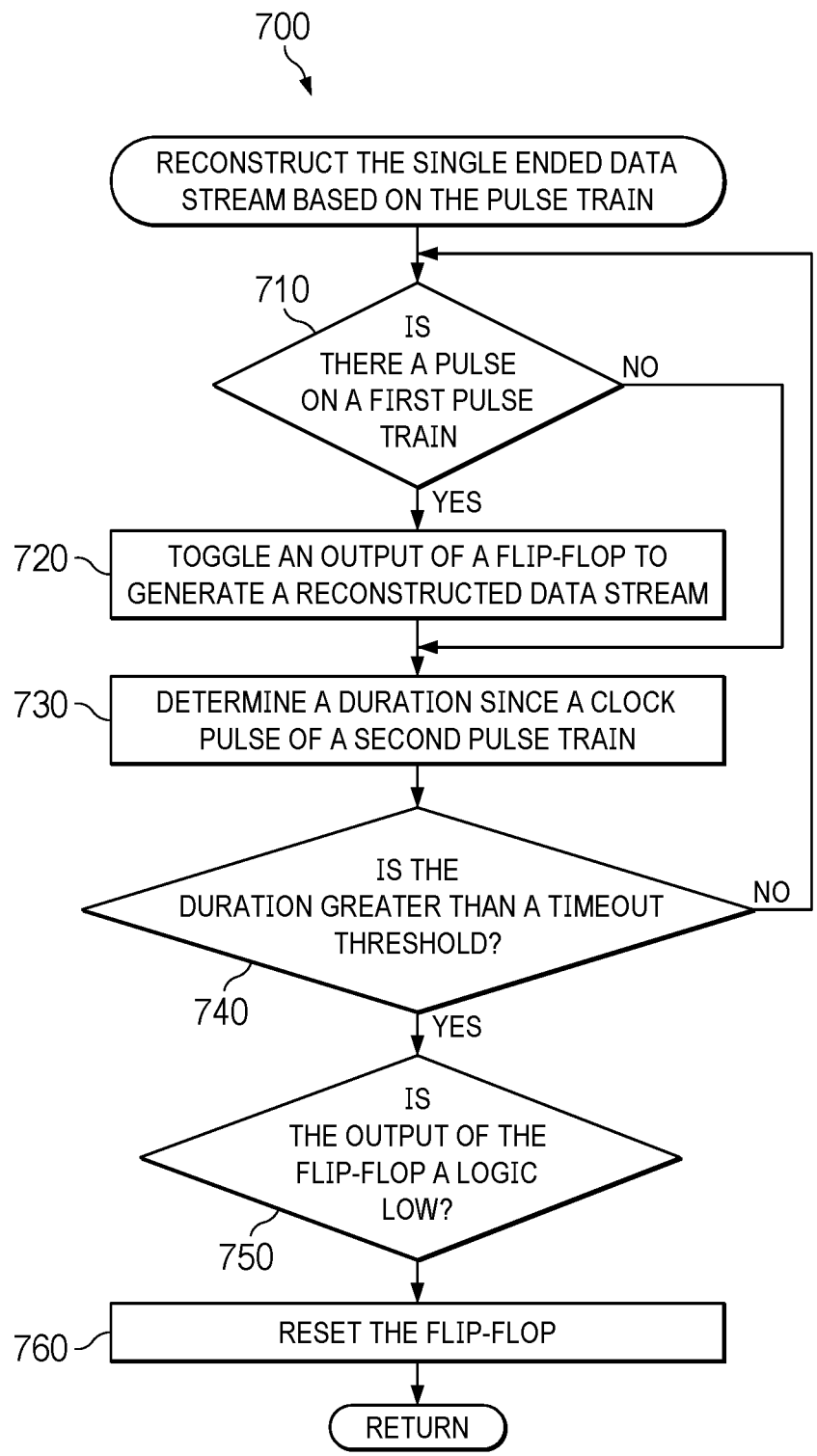
FIG. 7 is a flowchart representative of example operations of the reconstruction circuitry of FIGS. 1 and 3.

FIG. 7 is a flowchart representative of example operations 700 that may be performed by the reconstruction circuitry 125 of FIGS. 1 and 3. The example operations 700 of FIG. 7 begin at block 710, at which the flip-flop 310 of FIG. 3 determines if there is a pulse on a first pulse train (e.g., the data pulse train 440 of FIG. 4). In some examples, the clock input of the flip-flop 310 detects pulses of on the data pulse train 440.

If the flip-flop 310 determines there is a pulse on the first pulse train (e.g., Block 710 returns a result of YES), the clock input of the flip-flop 310 toggles the non-inverting output of the flip-flop 310. (Block 720). In some examples, the inverting output of the flip-flop 310 is coupled to the data input of the flip-flop 310, in which the non-inverting output of the flip-flop 310 toggles responsive to the clock input of the flip-flop 310 being supplied a pulse.

If the flip-flop 310 determines there is not a pulse on the first pulse train (e.g., Block 710 returns a result of NO) or operations of Block 720 are performed, the counter circuitry 330 of FIG. 3 determines a duration since a clock pulse of a second pulse train. (Block 730). In some examples, the counter circuitry 330 increments a count following a pulse on the clock pulse train from the second receiver channel circuitry 145 of FIGS. 1 and 2. In such examples, the counter circuitry 330 resets the count following a subsequent pulse on the clock pulse train.

The comparator circuitry 350 of FIG. 3 determines if the duration is greater than a timeout threshold of the timing margin 360 of FIG. 3. (Block 740). In some examples, the comparator circuitry 350 compares the duration since the previous pulse, from the counter circuitry 330, to the timeout threshold from the timing margin 360.

If the comparator circuitry 350 determines that the duration since the clock pulse of the second pulse train is not greater than the timeout threshold (e.g., Block 740 returns a result of NO), control proceeds to return to Block 710. If the comparator circuitry 350 determines that the duration since the clock pulse of the second pulse train is greater than the timeout threshold (e.g., Block 740 returns a result of YES), the comparator circuitry 350 determines if the non-inverted output of the flip-flop 310 is a logic low. (Block 750).

If the comparator circuitry 350 determines that the non-inverting output of the flip-flop 310 is a logic low (e.g., Block 750 returns a result of YES), control proceeds to end. If the comparator circuitry 350 determines that the non-inverting output of the flip-flop 310 is not a logic low (e.g., Block 750 returns a result of NO), the comparator circuitry 350 resets the flip-flop 310. (Block 760). In some examples, the comparator circuitry 350 sets the reset input of the flip-flop 310 equal to a logic high to reset the flip-flop 310. In such examples, after a reset, the non-inverting output of the flip-flop 310 is a logic low. Control proceeds to end.

Although example methods are described with reference to the flowchart illustrated in FIG. 7, many other methods of implementing the reconstruction circuitry 125 of FIGS. 1 and 3 may alternatively be used in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

Numerical identifiers such as "first," "second," "third," etc. are used merely to distinguish between elements of substantially the same type in terms of structure and/or function. These identifiers, as used in the detailed description, do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be responsive to an input, operation, or action of the device. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero.

Modifications are possible in the described embodiments, and other embodiments are possible, within the scope of the claims.

From the foregoing, it will be appreciated that example systems, apparatus, articles of manufacture, and methods have been described that improve edge-triggered digital isolation circuitry. Described systems, apparatus, articles of manufacture, and methods improve the efficiency of using a computing device by increasing data transmission speeds across isolation barriers. Described systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
    a single ended-to-differential (S2D) converter having a first terminal and a second terminal;
    a first buffer having a first terminal and a second terminal, the first terminal of the first buffer coupled to the first terminal of the S2D converter;
    a first capacitor having a first terminal and a second terminal, the first terminal of the first capacitor coupled to the second terminal of the first buffer;
    a second buffer having a first terminal and a second terminal, the first terminal of the second buffer coupled to the second terminal of the S2D converter;
    a second capacitor having a first terminal and a second terminal, the first terminal of the second capacitor coupled to the second terminal of the second buffer; and
    an inductor having a first terminal and a second terminal, the first terminal of the inductor coupled to the second terminal of the first capacitor, the second terminal of the inductor coupled to the second terminal of the second capacitor.

2. The apparatus of claim 1, wherein the first capacitor is configured to generate voltage rings that represent one of a rising edge or a falling edge at the first terminal of the first buffer responsive to an output from the first buffer.

3. The apparatus of claim 1, wherein the second capacitor is configured to generate voltage rings that represent one of a rising edge or a falling edge at the first terminal of the second buffer responsive to an output from the second buffer.

4. The apparatus of claim 1, wherein the inductor is a first inductor, and further comprising a second inductor and receiver circuitry, the second inductor magnetically coupled to the first inductor across an isolation barrier, the second inductor electrically coupled to the receiver circuitry.

5. The apparatus of claim 4, wherein the first inductor is configured responsive to the first capacitor and the second capacitor to induce a current in the second inductor, the current represents a voltage of the first capacitor and the second capacitor.

6. An apparatus comprising:
    receiver circuitry having a first output and a second output; and
    reconstruction circuitry including:
        a flip-flop having a clock input, a data input, a reset input, a non-inverting output, and an inverting output, the clock input of the flip-flop coupled to the first output of the receiver circuitry, the data input of the flip-flop coupled to the inverting output of the flip-flop; and
    validation circuitry including:
        counter circuitry having an input and an output, the input of the counter circuitry coupled to the second output of the receiver circuitry; and
        comparator circuitry including a first input, a second input, and an output, the first input of the comparator circuitry coupled to the output of the counter circuitry, the second input of comparator circuitry coupled to the non-inverting output of the flip-flop, the output of the comparator circuitry coupled to the reset input of the flip-flop.

7. The apparatus of claim 6, wherein the receiver circuitry is configured to generate a pulse train at the first output of the receiver circuitry, the pulse train having pulses that represent one of a rising edge or a falling edge of a serial data stream.

8. The apparatus of claim 7, wherein the flip-flop is configured responsive to the pulse train at the first output of the receiver circuitry to reconstruct the serial data stream.

9. The apparatus of claim 6, wherein the receiver circuitry is configured to generate a pulse train at the second output of the receiver circuitry, the pulse train having pulses that represent one of a rising edge or a falling edge of a clock.

10. The apparatus of claim 9, wherein the validation circuitry is configured responsive to the pulse train at the second output of the receiver circuitry to validate data at the non-inverted output of the flip-flop.

11. The apparatus of claim 6, wherein the counter circuitry is configured responsive to a pulse at the second output of the receiver circuitry to determine a duration since a previous pulse at the output of the counter circuitry.

12. The apparatus of claim 11, wherein the comparator circuitry is configured responsive to determining that the duration since a previous pulse is greater than or equal to a timeout threshold to reset the flip-flop by the output of the comparator circuitry.

13. A system comprising a transmitter circuitry, the transmitter circuitry further including:
a first converter configured to generate a differential data signal responsive to an input data signal;
a first set of one or more capacitors configured to generate voltage rings responsive to receiving the differential data signal, the voltage rings representative of edges of differential data signal;
a first inductor coupled to the first set of one or more capacitors;
a second converter configured to generate a differential clock signal responsive to an input clock signal;
a second set of one or more capacitors configured to generate voltage rings responsive to receiving the differential clock signal, the voltage rings representative of edges of differential clock signal; and
a second inductor coupled to the second set of one or more capacitors.

14. The system of claim 13, wherein the transmitter circuitry further including:
a first buffer and a second buffer coupled to the first converter and configured to receive the differential data signal;
a first and a second capacitor of the first set of one or more capacitors coupled to the first buffer and the second buffer respectively, wherein the first inductor is coupled between the first and the second capacitor;
a third buffer and a fourth buffer coupled to the second converter and configured to receive the differential clock signal; and
a third and a fourth capacitor of the second set of one or more capacitors coupled to the third buffer and the fourth buffer respectively, wherein the second inductor is coupled between the third and the fourth capacitor.

15. The system of claim 13 further comprising an encoder having inputs, a first output, and a second output, the encoder configured responsive to the inputs of the encoder to generate the input data signal, at the first output of the encoder, to the first converter, and to generate the input clock signal, at the second output of the encoder, to the second converter.

16. The system of claim 15 further comprising:
a third inductor magnetically coupled to the first inductor across an isolation barrier;
a fourth inductor magnetically coupled to the second inductor across the isolation barrier;
a first receiver circuitry coupled to first and second terminals of the third inductor, the first receiver circuitry configured to generate a first pulse train at a first output of the first receiver circuitry, the first pulse train having pulses that represent edges of the input data signal; and
a second receiver circuitry coupled to first and second terminals of the fourth inductor, the second receiver circuitry configured to generate a second pulse train at a second output of the second receiver circuitry, the second pulse train having pulses that represent edges of the input clock signal.

17. The system of claim 16 further including a reconstruction circuitry coupled to the first receiver circuitry and the second receiver circuitry, the reconstruction circuitry configured responsive to the first pulse train and the second pulse train configured to reconstruct a serial data stream, the serial data stream representative of the input data signal at the first output of the encoder.

18. The system of claim 17, wherein the reconstruction circuitry includes a flip-flop having a data input, a clock input, a non-inverted output, and an inverted output, the data input of the flip-flop coupled to the inverted output of the flip-flop, and the clock input of the flip-flop coupled to the first output of the first receiver circuitry.

19. The system of claim 18, wherein the flip-flop further has a reset input, the reconstruction circuitry further includes a validation circuitry having a first input and an output, the first input of the validation circuitry coupled to the non-inverted output of the flip-flop, the output of the validation circuitry coupled to the reset input of the flip-flop.

20. The system of claim 19, wherein the validation circuitry further having a second input coupled to the second output of the second receiver circuitry, the second input of the validation circuitry configured to receive the second pulse train.

21. The system of claim 20, wherein the validation circuitry further configured to:
determine a duration since a previous pulse responsive to a pulse at the second output of the second receiver circuitry;
determine that the duration since the previous pulse is greater than or equal to a timeout threshold; and
generate a signal at the output based on: (1) determination that the duration since the previous pulse is greater than or equal to a timeout threshold; and (2) a state of the non-inverted output of the flip-flop.

\* \* \* \* \*